US006838797B2

(12) United States Patent
Du

(10) Patent No.: US 6,838,797 B2
(45) Date of Patent: Jan. 4, 2005

(54) FLUX RING FOR AN ELECTRIC MOTOR

(75) Inventor: Hung T. Du, Reisterstown, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/312,966

(22) PCT Filed: Jul. 5, 2001

(86) PCT No.: PCT/US01/21343
§ 371 (c)(1),
(2), (4) Date: Aug. 4, 2003

(87) PCT Pub. No.: WO02/03528
PCT Pub. Date: Jan. 10, 2002

(65) Prior Publication Data
US 2004/0032179 A1 Feb. 19, 2004

Related U.S. Application Data

(63) Continuation of application No. 09/609,855, filed on Jul. 5, 2000, now Pat. No. 6,462,448.

(51) Int. Cl.[7] .............................................. H02K 21/26
(52) U.S. Cl. .............................. 310/154.28; 310/156.43
(58) Field of Search ....................... 310/154.01–154.49, 310/156.01–156.84, 47, 50

(56) References Cited

U.S. PATENT DOCUMENTS 3,519,858 A * 7/1970 Morganson .................. 310/47
4,110,718 A     8/1978 Odor et al. .................. 335/296
4,237,397 A * 12/1980 Mohr et al. ............ 310/154.26
4,417,167 A    11/1983 Ishii et al. ................ 310/67 R
4,438,362 A *  3/1984 Brown ....................... 310/152
4,935,655 A *  6/1990 Ebner .................... 310/154.29
5,204,569 A *  4/1993 Hino et al. ............ 310/154.28
5,796,200 A *  8/1998 Sakashita et al. ...... 310/156.05
6,080,352 A *  6/2000 Dunfield et al. ............ 264/427
6,462,448 B1 * 10/2002 Du ........................ 310/154.21

FOREIGN PATENT DOCUMENTS

| EP | 1 093 133 | 4/2001 |
| JP | 61 062349 | 3/1986 |
| WO | 93 22778 | 11/1993 |

OTHER PUBLICATIONS

International Search Report, PCT/US01/21343; ISA/EPO, Jun. 17, 2002.

* cited by examiner

*Primary Examiner*—Dang Le
(74) *Attorney, Agent, or Firm*—Harness, Dickey & Pierce P.L.C.

(57) ABSTRACT

A flux ring for a motor of a power tool has an annular housing which fits inside the motor can of the motor. At least one magnet is on the ring. The at least one magnet includes a portion formed from an isotropic magnetic material and a portion formed from an anisotropic magnetic material. Preferably, the isotropic magnetic materials is sandwiched by the anisotropic magnetic material. The magnets being molded onto the flux ring in a two shot process.

24 Claims, 2 Drawing Sheets

FLUX RING FOR AN ELECTRIC MOTOR

BACKGROUND AND SUMMARY OF THE INVENTION

The present invention relates to AC and DC motors and, more particularly, to flux rings for the motors.

In order to improve motor performance, Rare Earth magnet such as Injection Bonded Neodymium-Iron-Boron (N.I.B.) magnet is used. However, the rated operating temperature of the Injection Bonded N.I.B. magnet is typically in the range of 120° C. Thus, the power tool can be operated only up to this limited temperature. Also, the Injection Bonded N.I.B. magnet, particularly the isotropic N.I.B. magnet, is very hard to magnetize radially. The material costs increase dramatically when anisotropic material which enables radial magnetic field orientation is used.

The present invention provides the art with motor magnets which provide increased thermal performance. The magnets are also easier to magnetize such that the radial components of the magnets are directed to the center of the flux ring. Also, the magnets are cost-effective.

According to a first aspect of the invention, a flux ring for a motor comprises a ring which fits inside a motor can of the motor. At least one magnet is positioned on the ring. The at least one magnet includes a portion formed from an isotropic magnetic material and a portion formed from an anisotropic magnetic material. Generally, both magnets are formed from the isotropic and anisotropic materials. The isotropic as well as anisotropic materials are magnetic powders. Also, the isotropic and anisotropic magnetic materials are in a resin which enables the material to be injection molded onto the ring. The isotropic magnetic material portion is sandwiched between two anisotropic magnetic material portions such that the isotropic magnetic material portion is on an arc circle of between 40° and 50°. The magnet itself is on an arc circle of about 140° about the ring. The isotropic magnetic material portion is generally located on the poles of the motor.

In accordance with a second aspect of the invention, a method of manufacturing a flux ring comprises providing a ring having an anchoring mechanism. Placing the ring in a die. Molding a first isotropic magnetic material onto the ring where the anchoring mechanism secures the first isotropic magnetic material to the ring. Molding a second anisotropic magnetic material onto the ring adjacent the first isotropic magnetic material. The anchoring mechanism secures the second anisotropic magnetic material to the ring. Further, the anisotropic magnetic material is molded on two sides of the first isotropic magnetic material. The first isotropic magnetic material is molded without a magnetic field present. The second anisotropic magnetic material is molded under a magnetic field of about 1400–1600 amp/meter. Also, the first isotropic magnetic material is molded along an arc circle of the ring along 40° to 50° of the circle. The second anisotropic magnetic material is molded along the circle such that the magnet covers about 140° of the circle.

In accordance with a third aspect of the invention, a motor comprises a stator assembly with the stator assembly including a flux ring. The flux ring comprises an annular housing. At least one molded magnet is received on the housing. An anchor mechanism on the housing retains the at least one magnet on the annular housing. At least one magnet is positioned on the ring. The at least one magnet includes a portion formed from an isotropic magnetic material and a portion formed from an anisotropic magnetic material. Generally, both magnets are formed from the isotropic and anisotropic materials. The isotropic as well as anisotropic materials are magnetic powders. Also, the isotropic and anisotropic magnetic materials are in a resin which enables the material to be injection molded onto the ring. The isotropic magnetic material portion is sandwiched between two anisotropic magnetic material portions such that the isotropic magnetic material portion is on an arc circle of between 40° and 50°. The magnet itself is on an arc circle of about 140° about the ring. The isotropic magnetic material portion is generally located on the poles of the motor. Also, the motor comprises an armature rotatable within the stator assembly. A commutator is rotatable with the armature and connected to the armature via a shaft. A brush assembly is associated with the commutator.

In accordance with a fourth aspect of the invention, a power tool comprises a housing with a motor in the housing. The motor comprises a stator assembly with the stator assembly including a flux ring. The flux ring comprises an annular housing. At least one molded magnet is received on the housing. An anchor on the housing retains the at least one magnet on the annular housing. At least one magnet is positioned on the ring. The at least one magnet includes a portion formed from an isotropic magnetic material and a portion formed from an anisotropic magnetic material. Generally, both magnets are formed from the isotropic and anisotropic materials. The isotropic as well as anisotropic materials are magnetic powders. Also, the isotropic and anisotropic magnetic materials are in a resin which enables the material to be injection molded onto the ring. The isotropic magnetic material portion is sandwiched between two anisotropic magnetic material portions such that the isotropic magnetic material portion is on an arc circle of between 40° and 50°. The magnet itself is on an arc circle of about 140° about the ring. The isotropic magnetic material portion is generally located on the poles of the motor. Also, the motor comprises an armature rotatable within the stator assembly. A commutator is rotatable with the armature and connected to the armature via a shaft. A brush assembly is associated with the commutator. Also, the power tool includes an output member coupled with the motor shaft. An actuator member is electrically coupled between the motor and the power source to energize and de-energize the motor. In turn, when the motor is energized, the output member rotates.

Additional objects and advantages of the present invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
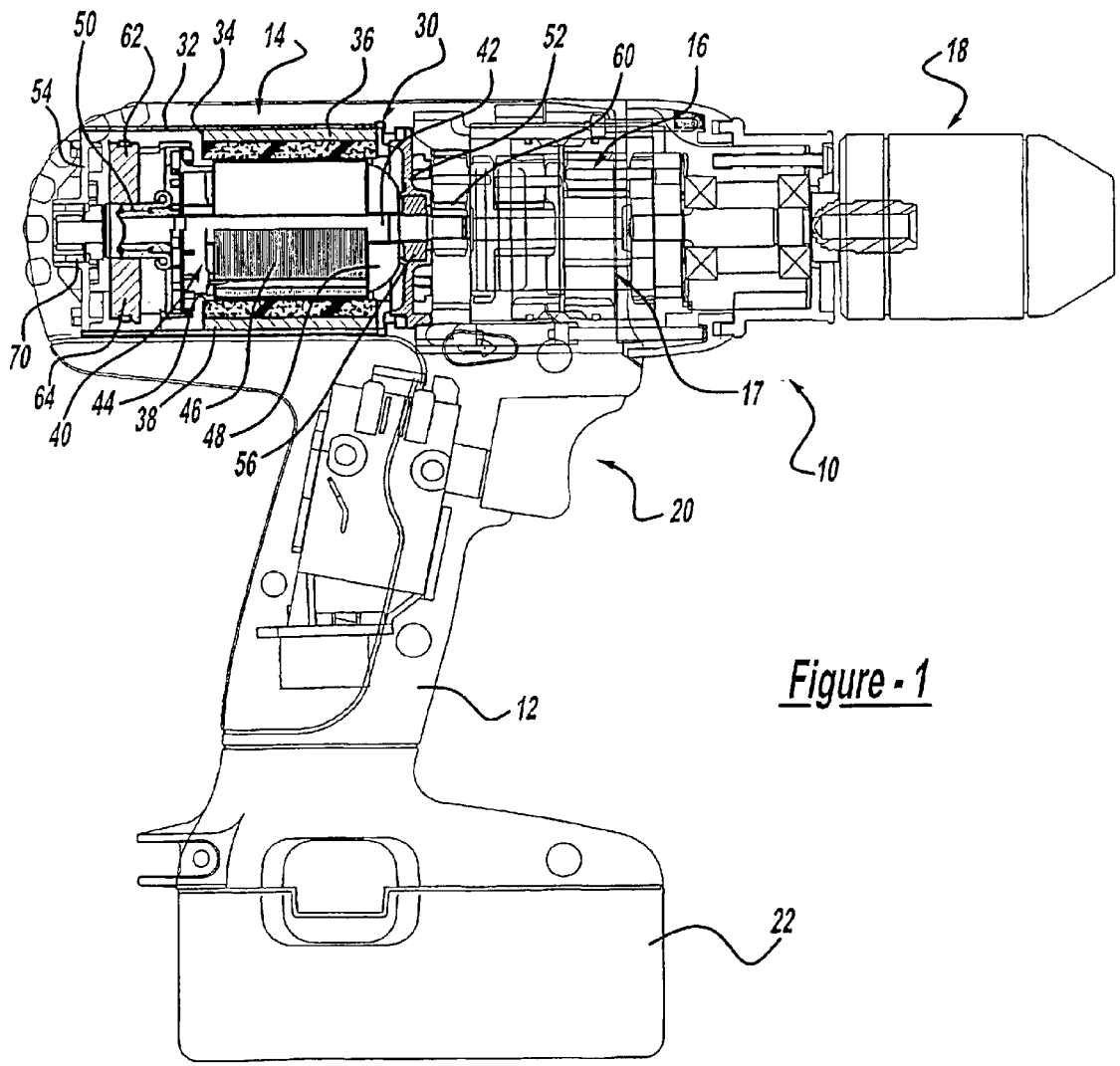
FIG. 1 illustrates a cross-section view of a power tool in accordance with the present invention.

Turning to FIG. 1, a power tool in accordance with the present invention is illustrated and designated with the reference numeral 10. The power tool 10 is illustrated as a drill; however, any type of power tool such as a screwdriver, sander, rotary tool, clippers, saw or the like which utilize an electric motor may be used with the motor of the present invention. The power tool 10 includes a housing 12 which surrounds a motor 14. An activation member 20 is coupled with the motor 14 as well as with a power source 22. The power source 22 may be a power cord (AC current) or the power tool may have a battery (DC current) as shown. The motor 14 is coupled with an output 16 which may include a transmission 17 and a chuck 18 to retain a tool (not shown) with the drill.

The motor 14 includes a stator assembly 30 which includes a housing 32, flux ring 34, and magnets 36 and 38. An armature 40 includes a shaft 42, a rotor 44 with laminations 46 and windings 48, as well as a commutator 50 coupled with the shaft 42. The motor also includes end plates 52 and 54. End plate 52 includes a bearing 56 which balances one end of the shaft 58 which is coupled with a pinion 60 which is part of the power tool output.

Brushes 62 and 64 which are associated with the commutator 50. A bearing 70 is also coupled with the end cap to balance rotation of the shaft 42.

Figure 2:
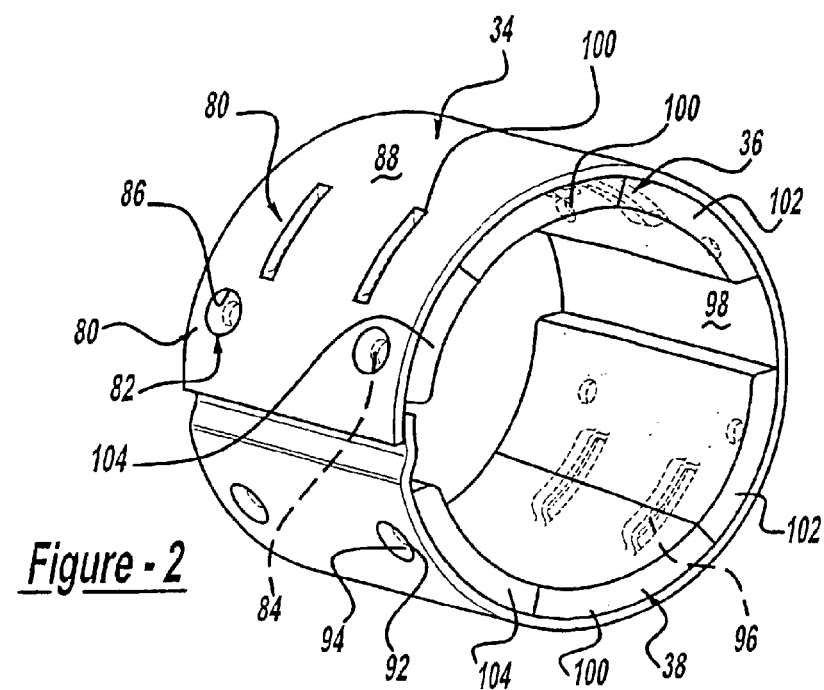
FIG. 2 illustrates a perspective view of a flux ring in accordance with the present invention.

Turning to FIG. 2, the flux ring 34 is illustrated with magnets 36 and 38. The magnets 36 and 38 are of a molded magnetic material. Preferably, the molded material is an injection molded material. The ring 34 is positioned within a die and the magnetic material is molded onto the flux ring. Also, the housing 32 may be used as the flux ring. Thus, the discussion with respect to the ring 34 may equally apply to the metallic housing 32 of the motor 14.

Figure 3:
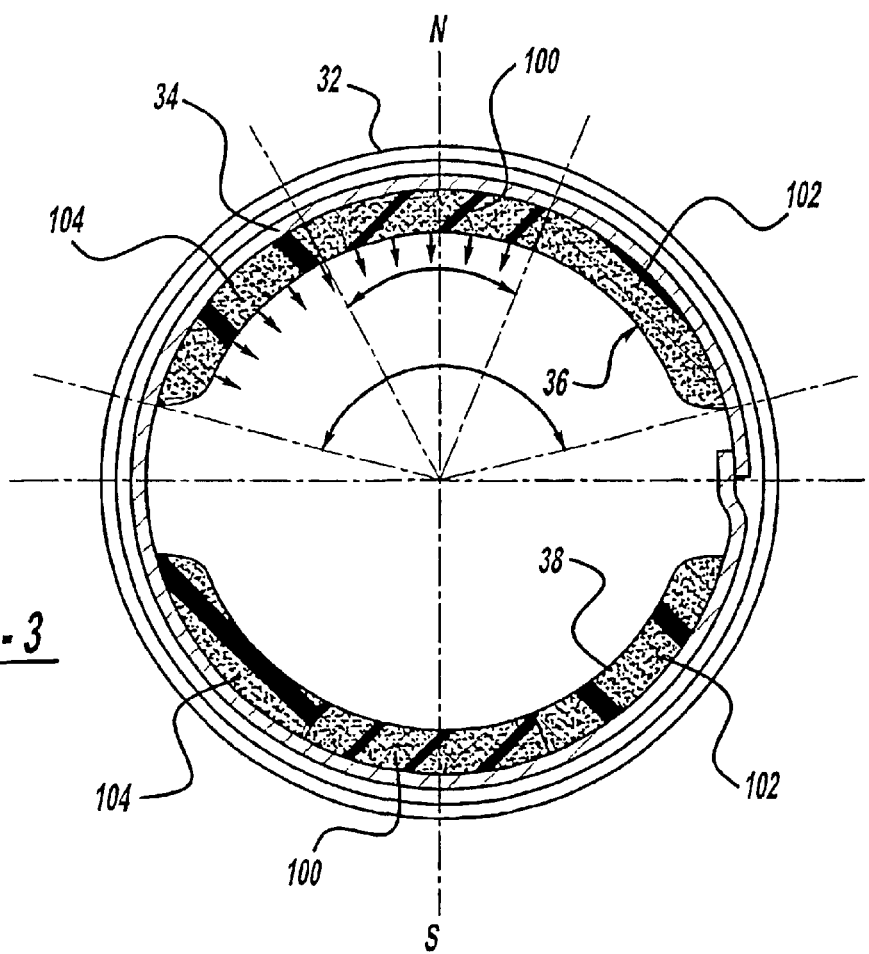
FIG. 3 is a cross-section view through FIG. 2 along line 3—3 thereof.

The flux ring 34 includes anchors 80 to retain the magnets 36 and 38 onto the ring 34. The anchors 80 may be of two types. First, anchor 82 is an aperture formed in the housing 34. The aperture 82 has a first portion 84 and a second counter-sink portion 86. The counter-sink portion 86 extends to the exterior 88 of the ring 34. Thus, as seen in the cross-section in FIG. 3, as the molded magnetic material is received in the aperture 82, the molded material has a neck 92 and a head 94. The head 94 and neck 92 provide an overall rivet appearance, thus the large head 94 acts to retain the magnet 36, 38 on the ring 34. The ring 34 may be comprised of just a plurality of aperture anchors 82 to retain the magnets on the ring 34.

Additional anchors 96 may be utilized on the ring. Anchors 96 project from the interior surface 98 of the ring 34. Ordinarily, the anchors 96 are stamped or the like into the ring 34 forming an aperture 100 immediately adjacent the projecting anchor 96. Thus, when the molded magnetic material forms around the projecting anchor 96, it likewise goes under the anchor 96 and fills in the aperture 100. This provides a firm securement for the magnet onto the ring 34. For a further understanding of the flux ring and anchors in accordance with the present invention, please see U.S. patent application Ser. No. 09/492,059 filed Jan. 27, 2000 entitled "Anchoring System for Injection Molded Magnets on a Flux Ring or Motor Housing", and U.S. patent application Ser. No. 09/520,471 filed Mar. 8, 2000 entitled "Permanent Magnet Motor Flux Rings", both of which the specification and drawings are herein incorporated by reference.

Turning to the magnets 36 and 38, only one will be described since the description relates to both. The magnets 36 and 38 are divided into three portions 100, 102 and 104. The portion 100 is sandwiched between the portions 102 and 104. The magnet portion 100 is positioned on magnets 36 and 38 along the north and south poles. The magnetic portion 100 is along an arc circle of from about 40° to 50°. The magnetic portion 100 is formed from an isotropic magnetic powder compound. Also, the magnet includes a resinous material to bring the isotropic compound into an injectionable form. The isotropic magnetic powder compound has a high temperature rating and can be magnetized in situ. Thus, as the isotropic material is magnetized, since the material straddles the north and south pole of the magnetizing device, the isotropic material has its magnetic field substantially parallel to the poles pointing to the center of the flux ring.

The magnetic portions 102 and 104 are formed from an anisotropic magnetic powder compound with a desired resin so that they are likewise injection moldable. The anisotropic magnetic powder material is much easier to magnetize so that the magnet field of the anisotropic magnetic magnet portions 102 and 104 extend radially towards the center of the flux ring as seen by the arrows. The total arc of the arc circle of the magnet with the anisotropic magnetic portions sandwiching each side of the isotropic magnetic portion is approximately 140°.

A method of manufacturing a flux ring in accordance with the invention is accomplished by providing the annular housing. The annular housing within a die wherein the magnets may be injection molded onto the die. First, the isotropic magnetic portion is molded onto the flux ring and secured onto the flux ring by an anchor as described above. In the second step, the anisotropic magnet material is injection molded on both sides of the isotropic magnetic material sandwiching it in between the two anisotropic magnetic material portions. While the anisotropic magnetic material is being molded, a magnetic field is present such that the anisotropic magnet material is molded in a field of about 1400 amp/meter. No field is present during the molding of the isotropic magnetic material. After molding, a magnetizing mandrel is positioned inside of the flux ring to magnetize the entire can assembly. After this, the magnet is magnetized so that the fields of each magnet is pointing to the center of the flux ring. After the flux ring is produced, it is welded into a motor can and the above described elements are added to form a motor. Then the motor would be positioned into the housing of the power tool.

While the above detailed description describes the preferred embodiment of the present invention, the invention is susceptible to modification, variation, and alteration without deviating from the scope and fair meaning of the subjoined claims.

What is claimed is:

1. A flux ring for a motor, comprising:

a ring for use with a motor can of a motor;

at least one magnet on said ring, said at least one magnet including a portion formed from an isotropic magnetic material and a portion formed from an anisotropic magnetic material said isotropic and anisotropic magnetic material having a commonly directed magnetic field.

2. The flux ring according to claim 1, wherein isotropic magnetic material being an isotropic magnetic powder.

3. The flux ring according to claim 1, wherein said anisotropic magnetic material being an anisotropic magnetic powder.

4. The flux ring according to claim 1, wherein said isotropic magnetic material portion is sandwiched between two anisotropic magnetic material portions.

5. The flux ring according to claim 4, wherein said isotropic magnetic material portion spans an arc circle of between 40° and 50° about said ring and said isotropic and two anisotropic magnetic material portions span about 140° about said ring.

6. The flux ring according to claim 5, wherein said isotropic magnetic material is located on one of the poles of a motor.

7. The flux ring according to claim 6, wherein one end is connected to said housing.

8. The flux ring according to claim 1, wherein said flux ring includes a pair of magnets.

9. A motor comprising:
 a stator assembly, said stator assembly including a ring comprising:
  at least one magnet on said ring, said at least one magnet including a portion formed from an isotropic magnetic material and a portion formed from an anisotropic magnetic material said isotropic and anisotropic magnetic material having a commonly, directed magnetic field;
 an armature rotatable within said stator assembly;
 a commutator rotatable with said armature and connected to said armature via a shaft; and
 brush assemblies associated with said commutator.

10. The flux ring according to claim 9, wherein isotropic magnetic material being an isotropic magnetic powder.

11. The flux ring according to claim 9, wherein said anisotropic magnetic material being an anisotropic magnetic powder.

12. The flux ring according to claim 9, wherein said isotropic magnetic material portion is sandwiched between two anisotropic magnetic material portions.

13. The flux ring according to claim 12, wherein said isotropic magnetic material portion spans an arc circle of between 40° and 50° about said ring and said isotropic and two anisotropic magnetic material portions span about 140° about said ring.

14. The flux ring according to claim 13, wherein said isotropic magnetic material is located on one of the poles of a motor.

15. The flux ring according to claim 14, wherein one end is connected to said housing.

16. The flux ring according to claim 9, wherein said flux ring includes a pair of magnets.

17. A power tool comprising:
 a housing;
 a motor in said housing, said motor comprising:
  a stator assembly, said stator assembly including a ring comprising:
   at least one magnet on said ring, said at least one magnet including a portion formed from an isotropic magnetic material and a portion formed from an anisotropic magnetic material, said isotropic and anisotropic magnetic material having a commonly directed magnetic field;
  an armature rotatable within said stator assembly;
  a commutator rotatable with said armature and connected to said armature via a shaft;
  brush assemblies associated with said commutator;
 a power supply;
 an output member coupled with said motor shaft; and
 an actuator member electrically coupled between said motor and said power source for energizing and de-energizing said motor which, in turn, rotates said output member when said motor is energized.

18. The flux ring according to claim 17, wherein isotropic magnetic material being an isotropic magnetic powder.

19. The flux ring according to claim 17, wherein said anisotropic magnetic material being an anisotropic magnetic powder.

20. The flux ring according to claim 17, wherein said isotropic magnetic material portion is sandwiched between two anisotropic magnetic material portions.

21. The flux ring according to claim 20, wherein said isotropic magnetic material portion spans an arc circle of between 40° and 50° about said ring and said isotropic and two anisotropic magnetic material portions span about 140° about said ring.

22. The flux ring according to claim 21, wherein said isotropic magnetic material is located on one of the poles of a motor.

23. The flux ring according to claim 22, wherein one end is connected to said housing.

24. The flux ring according to claim 17, wherein said flux ring includes a pair of magnets.

* * * * *